United States Patent
Ohtani et al.

(10) Patent No.: US 6,307,651 B1
(45) Date of Patent: *Oct. 23, 2001

(54) IMAGE PROCESSING APPARATUS AND METHOD

(75) Inventors: Atsushi Ohtani, Inagi; Nobuyuki Hirai; Mitsuo Morita, both of Tokyo; Nobuyuki Bannai, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,097

(22) Filed: Oct. 15, 1997

(30) Foreign Application Priority Data

Oct. 16, 1996 (JP) .................................................. 8-273527
Sep. 10, 1997 (JP) .................................................. 9-245321

(51) Int. Cl.⁷ ..................................................... H04N 1/46
(52) U.S. Cl. ........................................... 358/524; 358/518
(58) Field of Search .................................. 358/504, 505, 358/404, 444, 515, 518, 524, 501; 382/296, 297, 298; 395/116, 115, 109

(56) References Cited

U.S. PATENT DOCUMENTS 5,729,664 * 3/1998 Ishikawa ............................... 395/109
5,867,279 * 2/1999 Funamizu et al. .................... 358/296

* cited by examiner

*Primary Examiner*—Cheukfan Lee
(74) *Attorney, Agent, or Firm*—Fitzpatrick, Cella, Harper & Scinto

(57) ABSTRACT

An image processor includes a first write device which serially inputs each of plural kinds of color component data for each pixel, and writes each color component data into a first line buffer for each line. A second write device reads in a unit of a line for each color component data written in the first line buffer, and writes each color component data corresponding to the plural lines into a second line buffer having a storage capacity which is larger than that of the first line buffer. A conversion device performs longitudinal-to-lateral conversion by using each color component data corresponding to the plural lines written in the second buffer. An output device serially outputs a visible image representing each color component data corresponding to the plural lines converted by the conversion device.

23 Claims, 6 Drawing Sheets

IMAGE PROCESSING APPARATUS AND METHOD

BACKGROUND OF THE INVENTION

1. Field of the Invention

The present invention relates to an image processing apparatus and method for processing color image data.

2. Related Background Art

Conventionally, a color image read processing apparatus such as a facsimile apparatus, a copy machine, a scanner or the like which can read a color original has been developed.

In such the conventional color image read processing apparatus, after an analog signal inputted from a reader such as a scanner or the like is analog-to-digital converted, image processing is performed by controlling on a system side.

In a case where luminance signals, i.e., R (red), G (green) and B (blue) signals which were read and inputted by the reader are converted into density signals, i.e., C (cyan), M (magenta), Y (yellow) and K (black) signals to be outputted to a printer, the inputted luminance signals are sequentially processed. Then, for subsequent processes, the C, M, Y and K signals are transferred to an image buffer and/or an image memory in the form of a mixture of respective color components, e.g., pixel sequentially.

For example, in a system where R, G and B components in the original are read line-sequentially and time-divisionally, if each of the R, G and B components is read in 5 ms and original feeding of one line is performed in 5 ms, a time necessary for image reading working of one line is a total 20 ms.

In a case where an A4-size original is read in a main-scan direction in 8 Pels/mm, in order to terminate transferring working of C, M, Y and K signals in time to reading speed, if the luminance signal of the B component is inputted after the R and G components of one line are inputted, the C, M, Y and K signals are sequentially outputted for each pixel. Therefore, since the one line is transferred in 5 ms, data transferring must be performed for image signals including total 6912 pixels for the C, M, Y and K signals. Further, in order to output the binarized C, M, Y and K signals, the data transferring is performed in a state where the C, M, Y and K components are mixed with others in a unit of one bit, or the C, M, Y and K components are subjected to buffering and then transferred in a unit of eight bits or sixteen bits, and thereafter the image signals are stored in a next buffer in the form where the C, M, Y and K components are mixed with others in a unit of eight bits or sixteen bits.

However, in the conventional manner where the analog signal from the reader is analog-to-digital converted and then the image process is performed by the controlling on the system side, if multivalue data is managed in such image process, a load for the process increases, so that performance of the entire system comes to depend on the capability or bus speed of a CPU. Therefore, in order to realize the high-speed process, it is necessary to significantly change the system.

For example, when the process is performed by a dedicated hardware operating by controlling of another CPU, if the image data is processed coincidently with the reading speed of the reader, there is a problem that system operation becomes unstable when the reading is performed according to the load on the system side.

Further, when the read luminance signals (R, G and B) are converted into the density signals (C, M, Y and K) to be outputted to a print means such as a printer or the like, the inputted luminance signals are sequentially processed, and then for the subsequent processes, the C, M, Y and K signals are transferred to the image buffer and/or the image memory in the form of mixture of the respective color components (e.g., pixel sequentially). However, when these data are outputted to a printer in which print dots are arranged in a direction perpendicular to the main-scan direction in an ink jet method or the like, there are the following problems.

(1) In order to transfer each color data, pixel by pixel, in synchronism with a reading trigger, in the above-described conventional example, the C, M, Y and K signals must be outputted during a time of inputting the B component. Therefore, in order to transfer the data without lack of image information, a system must be designed which can perform an extremely high-speed and complicated image process, thereby increasing the cost of an entire apparatus.

(2) When a record unit is a serial-type record unit (i.e., print dots are arranged in sub-scan direction) such as the ink jet printer, a process (longitudinal-to-lateral converting) is necessary to re-arrange the image information in the sub-scan direction such that the image read in the main-scan direction can be recorded by the plural lines coincidently with a printing method of a record head. Therefore, when the image is transferred to the record unit, if such transferring is performed in a state that the respective colors are mixed in one pixel, an extremely high-speed and complicated process is necessary to match the image with the printing method of the record head.

SUMMARY OF THE INVENTION

The present invention has been made to solve at least one of the above-described conventional problems, and an object thereof is to perform longitudinal-to-lateral converting on image data inputted in a unit of a pixel, by simple writing and reading control.

In order to achieve the above object, according to one preferred embodiment of the present invention, there are provided:

a first write means for serially inputting each of plural kinds of color component data on each pixel, and writing each color component data into a first line buffer on each line;

a second write means for reading in a unit of a line each color component data written in the first line buffer, and writing each color component data corresponding to the plural lines into a second line buffer having a storage capacity which is larger than that of the first line buffer;

a conversion means for performing the longitudinal-to-lateral converting by using each color component data corresponding to the plural lines written in the second line buffer; and an output means for serially outputting a visible image representing each color component data corresponding to the plural lines converted by the conversion means.

An another object of the present invention is to perform an image process on inputted image data at high speed and also to smoothly transfer the image-processed data to another system at independent timing.

A further another object of the present invention is to provide structure which can transfer, when the image data is transferred to the another system, the data in a form suitable for an image process in the another system.

In order to achieve the above objects, according to one preferred embodiment of the present invention, there are provided:

an image process unit for performing an image process on color component data of plural colors serially inputted by a predetermined input means, in response to a first sync signal;

a first write means for writing the image data image-processed by the image process unit, into a first line buffer in response to the first sync signal; and a second write means for writing the image data stored in the first line buffer, into a second line buffer operating in response to a second sync signal.

The above and other objects, features, and advantages of the present invention will be apparent from the detailed description and the appended claims in conjunction with the accompanying drawings.

Figure 1:
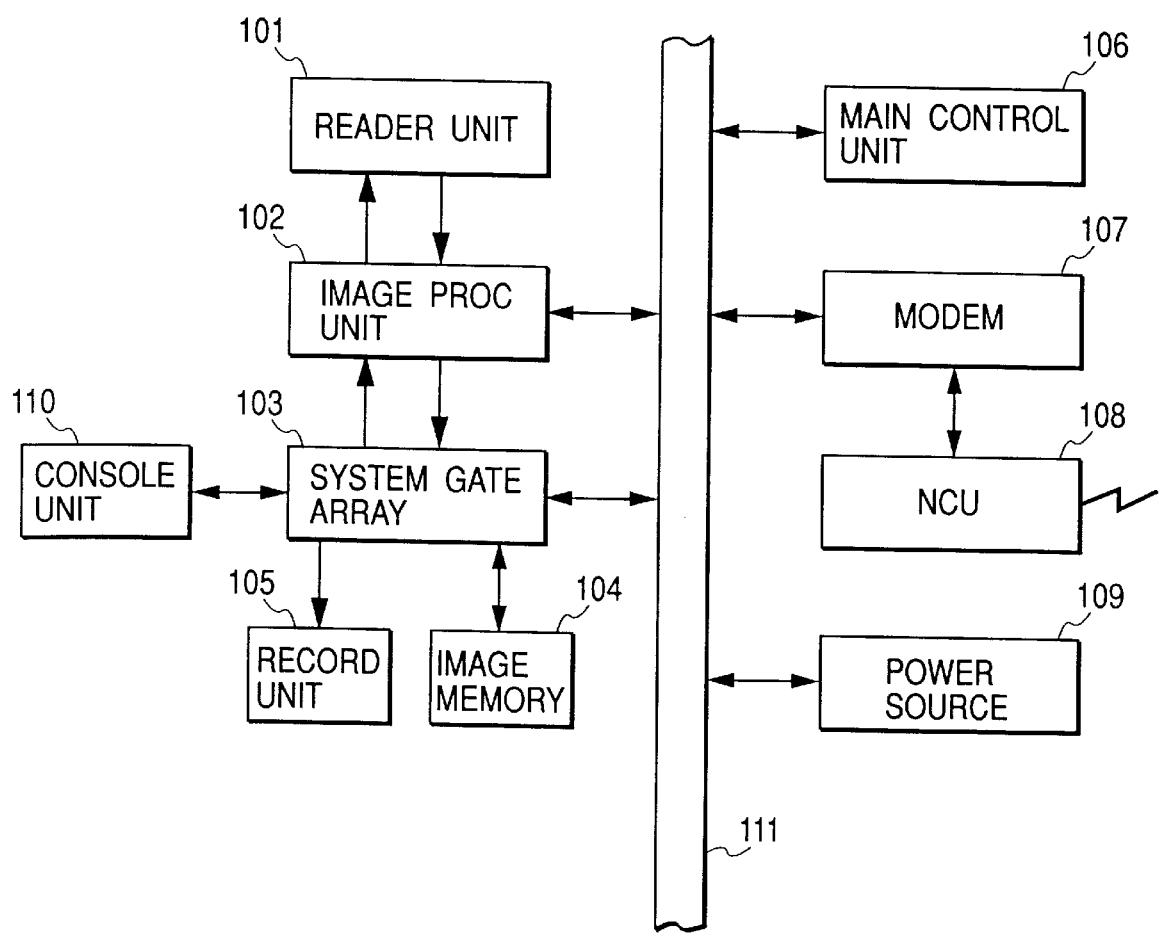
FIG. 1 is a system block diagram showing the entire structure of the present invention.

DETAILED DESCRIPTION OF THE PREFERRED EMBODIMENT (FIG. 1: Explanation of System Block Diagram)

FIG. 1 is a system block diagram of a color image reading process apparatus according to the present invention which is used to perform color copying of a color image in a facsimile apparatus, a copy machine or the like. In FIG. 1, reference numeral 101 denotes a reader unit which reads a color image original. The reader unit 101 includes a light source capable of time-divisionally switching R (red), G (green) and B (blue) light sources respectively generating R, G and B analog signals, and a line sensor. Reference numeral 102 denotes an image process unit which digitalizes the R, G and B analog signals and converts them into C (cyan), M (magenta), Y (yellow) and K (black) binary signals. Reference numeral 103 denotes a system gate array which performs the entire system controlling and handling of image data in accordance with instructions of a main control unit 106. Further, reference numeral 104 denotes an image memory which temporarily stores an image signal; 105 denotes a record unit which records the image signal; 106 denotes the main control unit which controls operation of the color image reading process apparatus as a whole; 107 denotes a modem which modulates and demodulates the image signal; 108 denotes a NCU (network control unit) which controls connecting between a telephone line and the color image reading process apparatus; 109 denotes a power source; 110 denotes a console unit which includes a keyboard and an LCD for displaying a state of the image reading process apparatus and the like and which inputs instructions to start reading and transmitting the data; and 111 denotes a system bus which transfers and receives the data and the instructions.

(FIG. 1: Explanation of System Operation)

Subsequently, an operation flow in a case of copying a color original will be explained hereinafter with reference to FIG. 1. Initially, when the original is set on an original mounting board (not shown), and a color copying instruction is inputted by an operator through the console unit 110, the main control unit 106 outputs a reading instruction to the image process unit 102 through the system bus 111.

An XSH sync signal (described later) is inputted from the system gate array 104 to the image process unit 102 at 5 ms interval. Thus, in accordance with the reading instruction, the image process unit 102 switches designating of a turning-on LED on each XSH sync signal beginning from that immediately after the reading instruction was inputted, and outputs a reading sync signal and an output sync clock to the reader unit 101.

The switching of the turning-on light source (LED) and data inputting operation by the image process unit 102 are performed together with the reading operation of each of the R, G and B components as one set, in response to one reading trigger. The reader unit 101 time-divisionally switches the turning-on light source for the color image, and reads each of the R, G and B components in 5 ms on each line.

In the present embodiment, it is assumed that one color is stored in 5 ms. Thus, a R light source (not shown) is initially turned on in 5 ms. Light from the R light source is illuminated onto the original, and its reflection light is received by a line sensor such as a contact sensor or the like in the reader unit 101, thereby reading the original with 8 Pels/mm (=203 dpi) in a main-scan direction. The received light is photo-electric converted and then transferred to the image process unit 102 as the R analog electrical signal.

Such process is similarly performed on the G and B light sources, and thus the processes are line-sequentially performed in the order of R, G and B on each line. The images read by the reader unit 101 are transferred to the image process unit 102 as the R, G and B analog signals. Then, the image process unit 102 performs the A/D Converting and an image process on the inputted R, G and B analog signals to convert them into the C, M, Y and K signals. Such image process will be later described in detail. The C, M, Y and K signals converted by the image process unit 102 are transferred to the image memory 104 through the system gate array 103, and are temporarily stored therein.

After that, the C, M, Y and K signals are again transferred to the record unit 105 through the system gate array 103. Such image signal process performed through the system gate array 103 will be described later in detail. The C, M, Y and K signals outputted from the system gate array 103 are inputted to the record unit 105 in a data format suitable for a characteristic of a print head.

Figure 5:
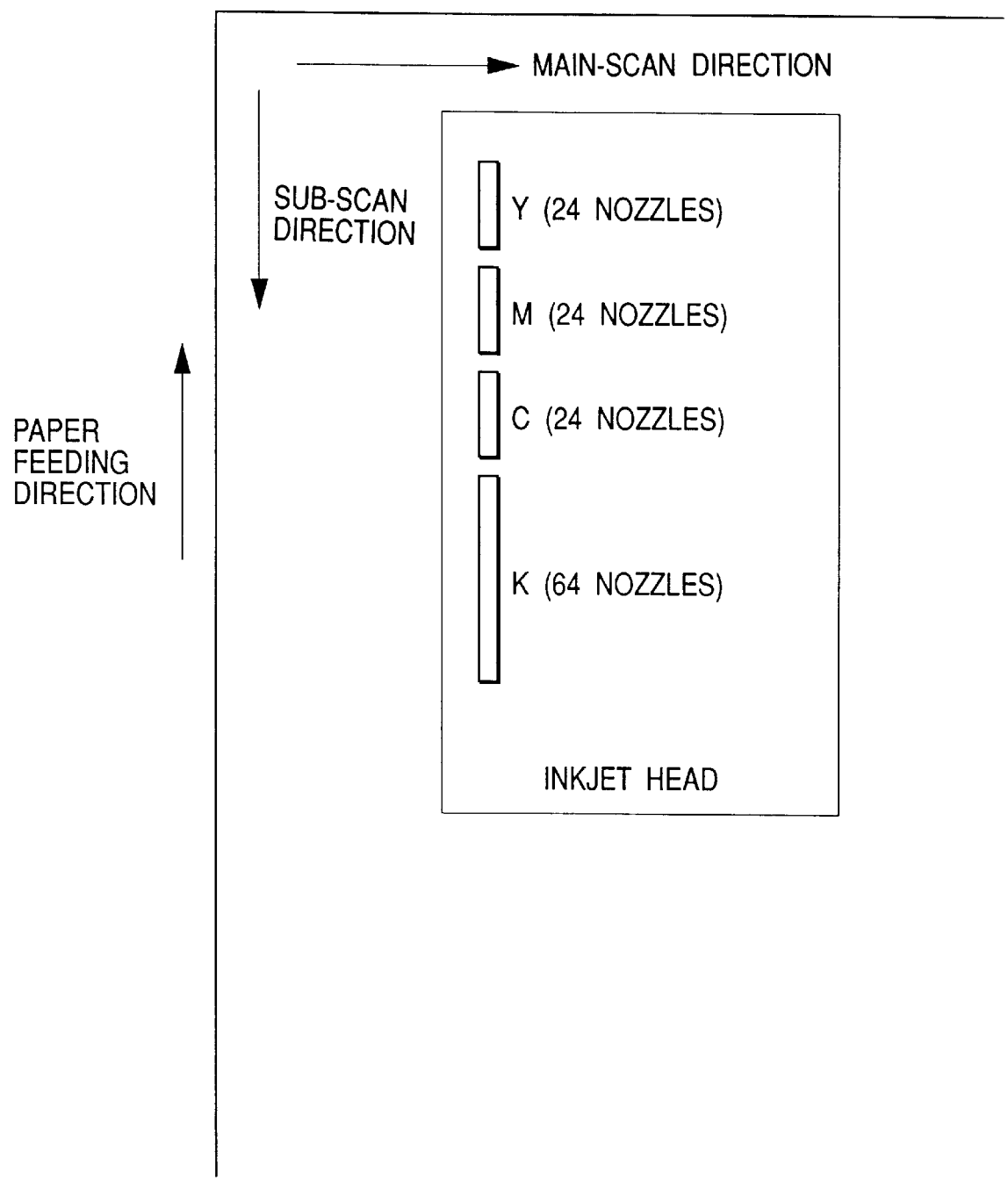
FIG. 5 is a view for explaining a recording unit of the present invention.

The print head of this record unit 105 is an ink jet-type record head on which plural nozzles are arranged in a sub-scan direction to form a head record surface. FIG. 5 shows the positional relation of the respective color nozzles of this type record head, a feeding direction of a recording paper, the main-scan direction and the sub-scan direction.

On the print head shown in FIG. 5, there are 64 nozzles for recording K in the sub-scan direction. In these nozzles, only 24 nozzles are used in case of color printing. Further, in parallel with the K nozzles, there are three sets of 24 nozzles for respectively recording C, M and Y in the order of C, M and Y. In case of recording the color image, all the C, M, Y and K color data are respectively stored by the 24 nozzles, and then the recording starts.

Then, a carriage on which the head is mounted is reciprocated in the main-scan direction perpendicular to a nozzle arrangement direction, whereby the image is formed in an area corresponding to a recording width of the plural nozzles. Thereafter, the recording paper is fed in the sub-scan direction by the recording width, and the recording operation is repeated, whereby the image is formed on the recording paper. It should be noted that this print head is an ink cartridge in which a tank for storing ink is provided. Further, it should be noted that a thermal-transfer-type record head may be used as the above-described record head. When all the stored image data are read and thus it is judged that the recording was completed, the recording operation terminates.

Figure 2:
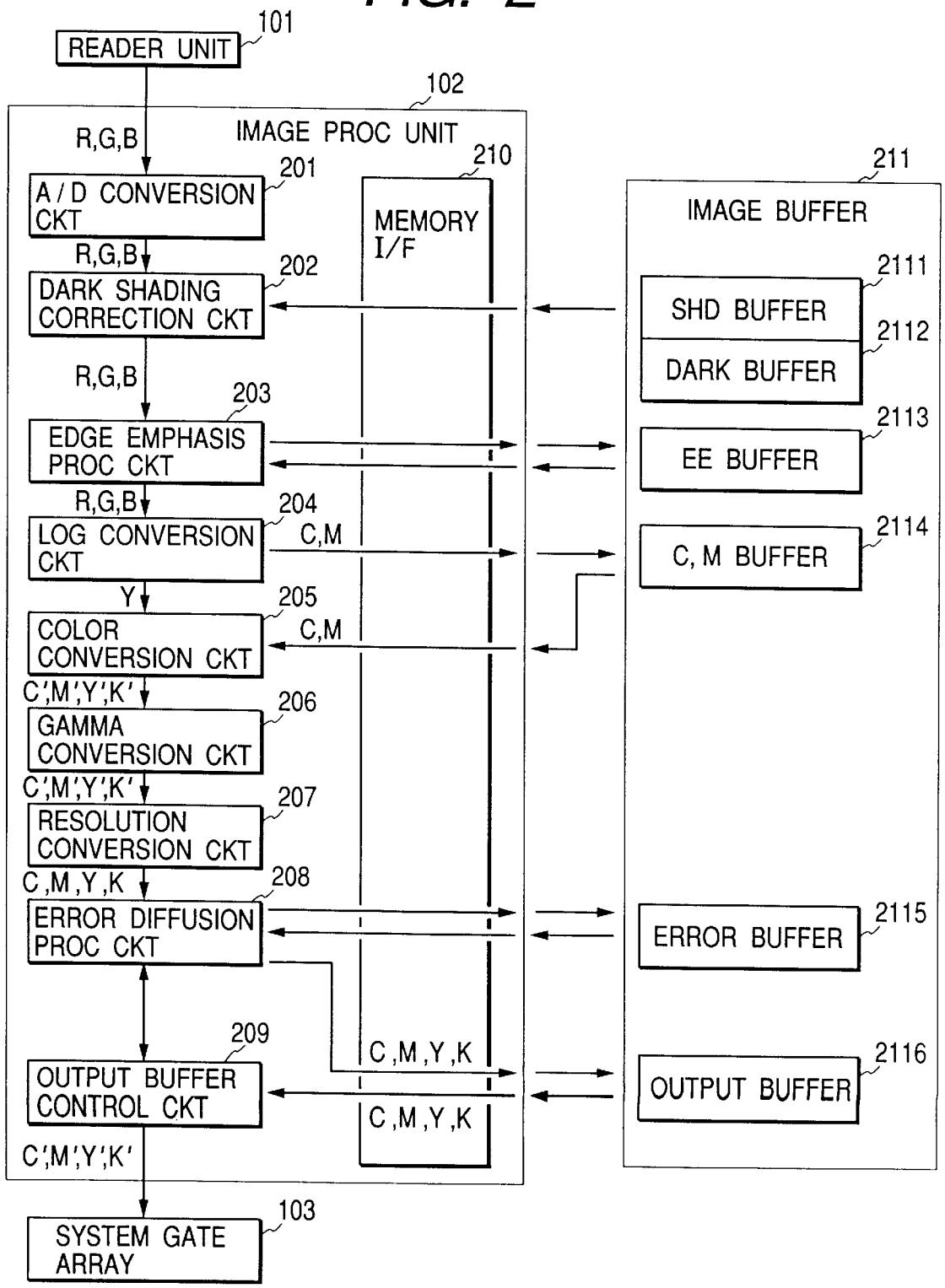
FIG. 2 is a block diagram for explaining an image process unit of the present invention.

(FIG. 2: Explanation of Image Process Unit)

FIG. 2 shows the detailed structure of the image process unit 102 according to the present invention in FIG. 2, reference numeral 201 denotes an A/D conversion circuit which converts the R, G and B analog signals sent from the reader unit 101 into the R, G and B digital signals, respectively; 202 denotes a dark shading correction process circuit which corrects sensitivity of each pixel and a black level; 203 denotes an edge emphasis process circuit which emphasizes an edge portion; 204 denotes a LOG (logarithmic) conversion circuit which converts the R, G and B digital signals into the C, M and Y signals respectively by correcting the scanner characteristic; 205 denotes a color conversion circuit which calculates Min(C,M,Y) from the C, M and Y signals to generate the K component and performs color converting by matrix calculating; and 206 denotes a gamma conversion circuit which performs gamma converting to match the C, M, Y and K signals with a density characteristic of the record unit.

Further, reference numeral 207 denotes a resolution conversion circuit which converts the resolution 8 Pels/mm (=203 dpi) of the read image in the main-scan direction into resolution (360 dpi in the present embodiment) of the printer in the record unit 105, and reduces a size of the read image; and 208 denotes an error diffusion process circuit which converts the read signal into the binary signal.

Reference numeral 209 denotes an output buffer control circuit which performs write controlling of the output image data into an image buffer 211, masking of unnecessary image, and output controlling of each color component of the C, M, Y and K signals to the system gate array 103 in a unit of a line.

Reference numeral 210 denotes a memory interface which controls the data writing/reading into/from the image buffer 211 locally connected to an image process IC, so as to temporarily store the image data in each image process step. In the image buffer 211, there are provided an area of SHD buffer 2111 for storing shading correction data, an area of DARK buffer 2112 for storing dark correction data, an area of edge emphasis buffer 2113 for storing edge emphasis data, an area of C, M buffer 2114 for pixel synchronizing the image data line-sequentially inputted, an area of error buffer 2115 for storing error data generated in an error diffusion process, and an area of output buffer 2116 for temporarily storing the image data to be outputted. It should be noted that such area classification is changed according to processing contents.

(FIG. 2: Explanation of Image Process Operation)

Subsequently, flow of the image process in case of reading the color image will be explained with reference to FIG. 2. The A/D conversion circuit 201 converts the R, G and B analog signals inputted from the reader unit 101 into the digital signals in the order of R, G and B components, in a unit of a line. Each of these digital signals has eight bits for each pixel. Then, the R, G and B digital signals outputted from the A/D conversion circuit 201 are inputted to the dark shading correction circuit 202. In this circuit 202, dispersion in sensitivity of each pixel in the reader unit 101 is corrected on the basis of a value obtained by reading a white board (not shown) previously stored in the SHD buffer 2111 and a dark output correction value previously stored in the DARK buffer 2112, and then outputted as the six-bit digital signals.

In the edge emphasis process circuit 203, each of the shading-corrected six-bit R, G and B digital signals is independently edge-emphasized by detecting an edge portion. At that time, data referring in the EE buffer 2113 and input data writing into the edge emphasis process circuit 203 are simultaneously performed. Then, the edge-emphasized six-bit digital signals are line-sequentially inputted to the LOG conversion circuit 204 in the order of R, G and B, and converted into the density signals, i.e., the C, M and Y signals, such that the R, G and B signals are respectively converted into the C, M and Y signals.

Subsequently, in the converted C, M and Y signals, the Y component is directly inputted to the color conversion circuit 205. On the other hand, the C and M components for each pixel are stored once in the C, M buffer 2114, and then inputted to the color conversion circuit 205 in synchronism with the inputting of the Y component. Then, the color conversion circuit 205 generates the K component and performs the matrix calculating by referring to a look-up table, so as to output C', M', Y' and K' signals. The reason why the K component is generated is that, in a case where the printer having the nozzles capable of printing a K-component recording material in addition to C-, - and Y-component recording materials is used as the record unit 105, consumption of the C-, - and Y-component recording materials decreases and a quality in the printed image increases when the printing is performed by also using the K-component recording material. The six-bit C', M', Y' and K' signals sent from the color conversion circuit 205 are sent to the printer gamma conversion circuit 206. In the gamma conversion circuit 206, these signals are converted into the eight-bit C, M, Y and K signals by using the look-up table, to determine values suitable for a recording density characteristic of the record unit 105.

The eight-bit C, M, Y and K signals sent from the gamma conversion circuit 206 are the image signals which were read in the main-scan direction with 8 Pels/mm (=203 dpi) by the reader unit 101. Therefore, the resolution conversion circuit 207 converts the resolution of these signals into the printer resolution 360 dpi of the record unit 105, reduces the size of the read image and masks the unnecessary image.

Subsequently, if the resolution-converted eight-bit C, M, Y and K signals are intended to be binarized and outputted, these signals are binarized by referring to the data in the error buffer 2115 in the error diffusion process circuit 208, and then the error data is again stored in the error buffer 2115. The binarized image data are outputted to the image buffer 211 after these data corresponding to eight pixels can be all obtained. Then, if it is intended to perform multivalue outputting (256 gradations since eight bits in this case), the error diffusion process is not performed, but the image data is outputted to the image buffer 211 as the data has the eight bits for one pixel. By the controlling of the output control circuit 209, the image data is temporarily stored in the image buffer 211 in a unit of one line for each of the C, M, Y and K components. After that, the image data stored in the image buffer 211 is transferred in a unit of a line to the system gate array 103, in response to an output request from the main control unit 106. Details of such writing control operation of the image data into the image buffer 211 is illustrated in FIG. 3.

Figure 3:
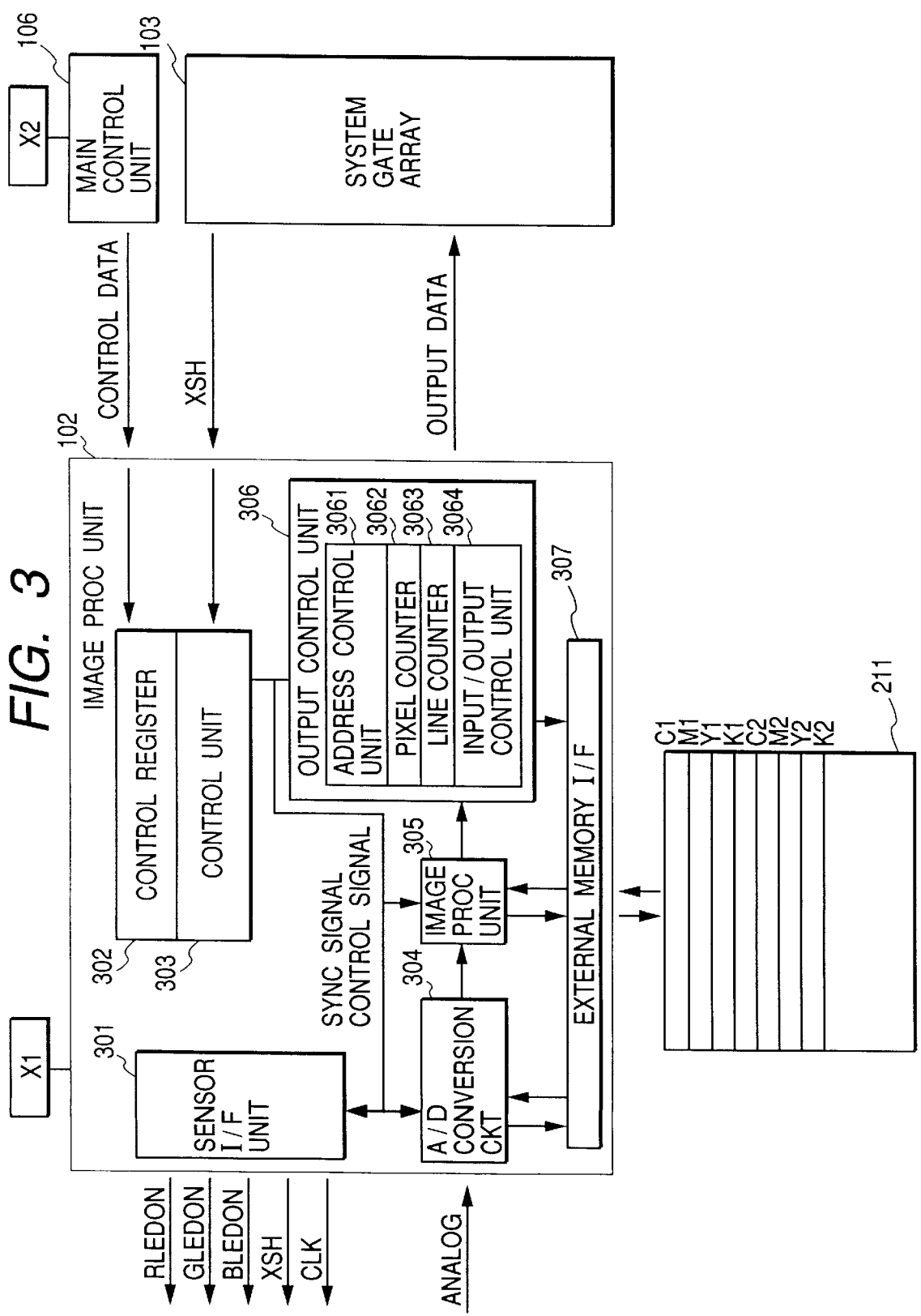
FIG. 3 is a block diagram for explaining an image buffer and a buffer control unit of the present invention.

(FIG. 3: Explanation of Buffer Control Unit)

FIG. 3 shows the internal block structure of the image process unit 102.

In FIG. 3, the image process unit 102 performs the operation (including data writing/reading into/from image buffer 211) at high speed in response to a sync signal X1. Thus, the R, G and B image data (later converted into C, M, Y and K image data) can be image processed at high speed irrespective of the operation of the later-stage system gate array 103, the record unit 105 and the like. Further, the reader unit 101 (FIG. 1) at the previous stage of the image process unit 102 operates in response to this sync signal X1.

On the other hand, within the image processing apparatus according to the present embodiment, the units (i.e., system gate array 103, record unit 105, main control unit 106 and the like) other than the reader unit 101 and the image process unit 102 operate in response to a sync signal X2.

In FIG. 3, the buffer 211 has the areas in which the C, M, Y and K signals for the recording can be respectively stored for two lines. Areas C1, M1, Y1, K1, C2, M2, Y2 and K2 in the image buffer 211 are line buffers of the respective colors.

Reference numeral 301 denotes a sensor interface unit which outputs the control signal to the read sensor (i.e., reader unit 101); 302 denotes a control register which stores data to designate contents of the operating by the image process unit 102; 303 denotes a control unit which controls the operating of each block in accordance with the setting of the control register 302; 304 denotes an A/D conversion circuit (corresponding to 201 in FIG. 2) which performs sampling/holding on the inputted analog image data and then A/D converting on the obtained data; 305 denotes an image process unit (corresponding to 202 to 208 in FIG. 8) which performs an image process on the A/D-converted image data; and 306 denotes an output control unit. Further, the output control unit 306 includes an address control unit 3061 which designates addresses of the areas in the image buffer 211 at which the C, M, Y and K signals pixel-sequentially inputted from the image process unit 305 are stored, a pixel counter 3062 which counts the number of the pixels of each of the areas C1, M1, Y1, K1, C2, M2, Y2 and K2, a line counter 3063 which counts the number of lines of each color, and an input/output control unit 3064 (corresponding to output control circuit 209 in FIG. 2) which controls outputting of a signal to designate an address of each pixel to the address control unit 3061, performs area switching between the areas C1 and C2 (such switching is performed also to the M, Y and K components), and performs line-buffer controlling. Further, reference numeral 307 denotes an external memory interface.

(FIG. 3: Explanation of Buffer Control Operation)

The operation will be explained for a case where the C, M, Y and K signals are inputted from the image process unit 305 to the image buffer 211 as the binary image data.

Initially, the input/output control unit 3064 sets the areas C1, M1, Y1 and K1 in the image buffer 211 writable. Both initial counter values of the pixel counter 3062 and the line counter 3063 are "0". The one-bit C component which was pixel-sequentially sent from the image process unit 305 is outputted to the image buffer 211, after such C component corresponding to eight pixels are obtained. Then, the component is inputted to the image buffer 211 and stored in the area C1 under the control of the address control unit 3061.

Then, the value of the line counter 3063 is counted to "1", and subsequently the eight-bit M component is stored in the area M1 under the control of the address control unit 3061. The value of the line counter 3063 is again counted to "2", and subsequently the eight-bit Y component is stored in the area Y1 and the K component is stored in the area K1 under the control of the address control unit 3061. When the value of the line counter 3063 is counted one by one to "4", the value of the line counter 3063 is reset to "0", and the value of the pixel counter 3062 is counted to "1".

Then, the C component of a pixel to be next inputted in the image buffer 211 is again stored in the area C1 under the control of the address control unit 3061. Subsequently, the value of the line counter 3063 is determined every time the color component changes, and the value of the line counter is reset and the value of the pixel counter 3062 is determined every time the pixel changes. The pixel counter 3062 counts the number of pixels until the respective color components of one line are stored in the areas C1, M1, Y1 and K1 respectively. When stored, the value of the pixel counter 3062 is reset.

It should be noted that, since the data writing into the image buffer 211 is performed in a unit of eight bits, the number of pixels in one line is a multiple of eight.

When the storing of the pixels corresponding to one line into the respective areas C1, M1, Y1 and K1 terminates, the input/output control unit 3064 sets the respective areas C1, M1, Y1 and K1 readable, switches the line buffer, and newly sets the respective areas C2, M2, Y2 and K2 writable. Then, the C, M, Y and K component signals of the next line are respectively stored in the areas C2, M2, Y2 and K2. In the case where the areas C1, M1, Y1 and K1 are readable, the C, M, Y and K components of one line stored in the respective areas C1, M1, Y1 and K1 are transferred to the system gate array 103 in synchronism with the next sync signal, in response to an output trigger inputted from the main control unit 106. That is, in a continuous output mode, the C, M, Y and K components are line-sequentially and continuously transferred to the array 103 in response to one output trigger. On the other hand, in an individual output mode, one color component of one line is transferred to the array 103 in response to one output trigger. Similarly, the color components in the next and subsequent lines are transferred to the system gate array 103 in response to the output trigger sent from the main control unit 106.

When the writing of the image signals into the areas C1, M1, Y1 and K1 terminate, the writable state of these areas is switched to the readable state. Then, during the time the image signals of the first line are being transferred, the areas C2, M2, Y2 and K2 are set writable, whereby the image signals of the second line are written into the areas C2, M2, Y2 and K2. When the writing of the image signals of the second line into the areas C2, M2, Y2 and K2 terminates and the transferring of the image signals from the areas C1, M1, Y1 and K1 to the system gate array 103 terminate as a whole, the areas C2, M2, Y2 and K2 are newly set readable. Then, the outputting of the image signals of the second line start in response to the output trigger sent from the main control unit 106.

After that, the areas C1, M1, Y1 and K1 are again set writable, and the image signals of the third line are stored in the areas C1, M1, Y1 and K1. As described above, the writing operation and the reading operation are alternately performed every two lines, whereby the image signals can be smoothly transferred without interrupting the image reading and transferring.

Figure 4:
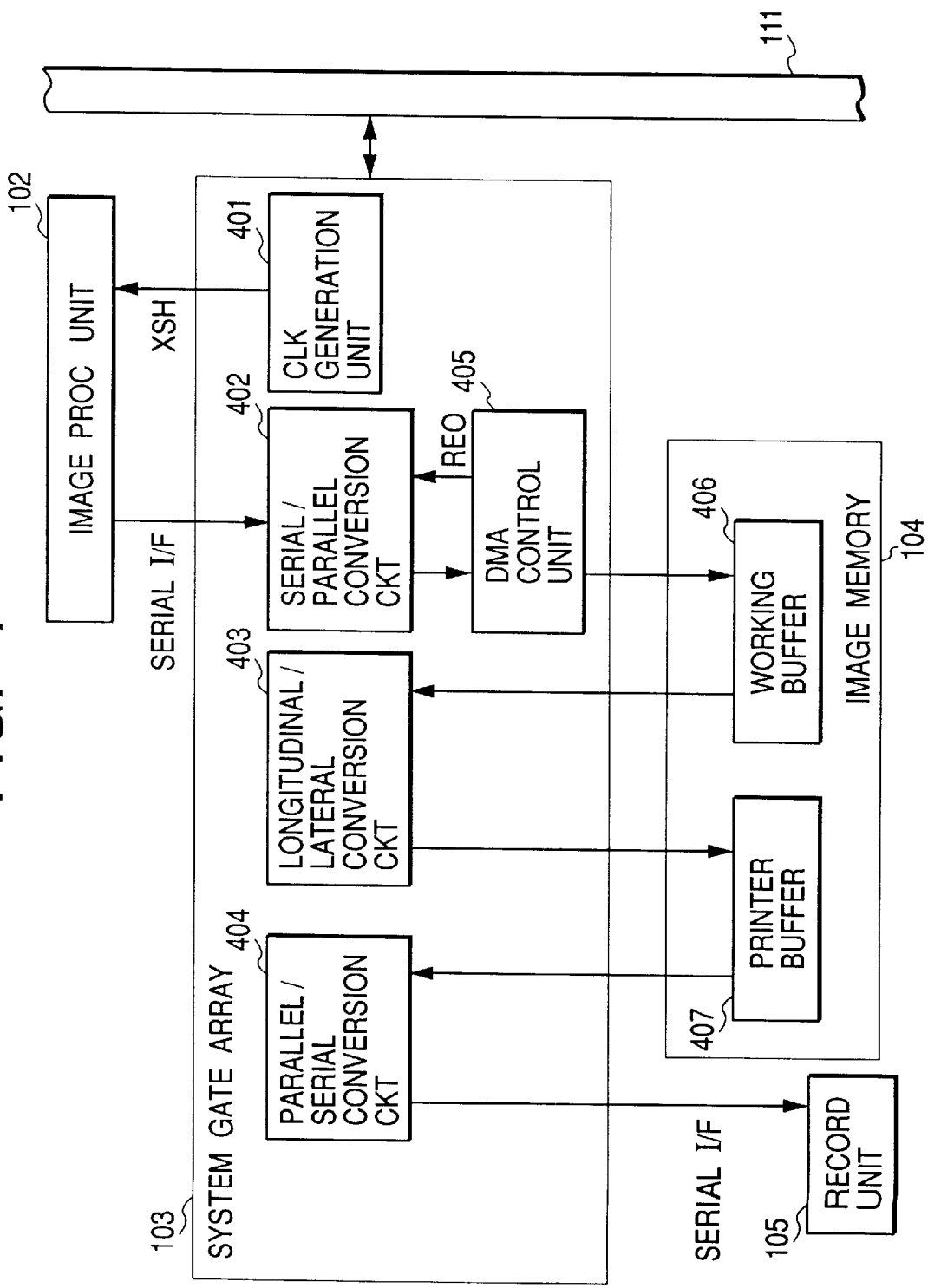
FIG. 4 is a block diagram for explaining a system gate array and an image memory of the present invention.

(FIG. 4: Explanation of System Gate Array)

FIG. 4 shows details of the system gate array 103 of the present embodiment in a case where the image process unit 102 of the present invention is connected to the system gate array 103 through a serial interface. In FIG. 4, reference symbol XSH denotes a clock which is generated from a clock generation unit 401 at a 5 ms interval to synchronize timing of all of the following operation. That is, in the main control unit 106, this clock is outputted as a read sync signal which is used to perform interruption processes such as generating of a read trigger, generating of a motor trigger to feed the original, generating of output triggers for C, M, Y and K signals, and setting of DMA (direct memory access) transferring for C, M, Y and K signals, and the like. Further, in the image process unit 102, this clock is outputted as a line control sync signal which is used to start inputting/outputting of R, G and B light source switch data. It should be noted that the clock XSH is different from the above-described sync signals X1 and X2.

Reference numeral 402 denotes a serial/parallel conversion circuit which converts serial data (i.e., image signals sent from image process unit 102) into parallel data through the serial interface; 403 denotes a longitudinal/lateral conversion circuit which converts the data arranging order to be matched with a print system of the record unit 105 which uses a printer having the nozzles arranged in the sub-scan direction; and 404 denotes a parallel/serial conversion circuit which again converts the parallel data (i.e., image signals) into the serial data.

Reference numeral 405 denotes a DMA control unit which performs the DMA transferring on the parallel data outputted from the serial/parallel conversion circuit 402 to transfer it to the image memory 104; and 406 denotes a working buffer which temporarily stores the data DMA-transferred from the DMA control unit 405 to transfer it to the longitudinal/lateral conversion circuit 403. The working buffer 406 stores the C, M, Y and K color component signals each corresponding to eight lines. Reference numeral 407 denotes a printer buffer which temporarily stores the data converted by the longitudinal/lateral conversion circuit 403 to transfer it to the parallel/serial conversion circuit 404. The printer buffer 407 stores the C, M, Y and K signals each corresponding to 24 nozzles×3 lines.

(FIG. 4: Explanation of System Gate Array Operation)

With reference to FIG. 4, the operation will be explained hereinafter in which the C, M, Y and K signals are transferred from the image buffer 211 in the image process unit 102 to the record unit 105 through the system gate array 103 and the image memory 104. When the areas C1, M1, Y1 and K1 in the image buffer 211 become readable, the output triggers for the C, M, Y and K signals are transferred for each color component to the image process unit 102 in synchronism with the sync signal, and the C, M, Y and K signals are sent from the areas C1, M1, Y1 and K1 one bit by one bit (i.e., information amount corresponding to one pixel when data is binarized by image process unit 102) in the order of C, M, Y and K lines.

Further, at the same timing of the output triggers for the C, M, Y and K signals, the DMA transfer setting to the DMA control unit 405 is updated for each of the C, M, Y and K components from the main control unit 106. Then, the DMA control unit 405 designate an address in the working buffer 406 at which each color component of each of the C, M, Y and K lines is stored, and the serial/parallel conversion circuit 404 transfers the data to the working buffer 406 in unit of eight bits or sixteen bits.

A timing chart of the above-described transferring of the image signals from the reader unit 101 to the working buffer 406 in the image memory 104 will be described in detail later. The working buffer 406 stores each eight-line data on each color component. When the eight-line data on each color component is stored in the working buffer 406, the image signals are transferred from the working buffer 406 to the longitudinal/lateral conversion circuit 403. In the longitudinal/lateral conversion circuit 403, the image signals stored in the main-scan direction are re-arranged every eight bits such that these image signals are stored in the sub-scan direction.

The longitudinal/lateral-converted image signals are transferred for every eight nozzles to the printer buffer 407 for each color component in the sub-scan direction. When the data corresponding to the 24 nozzles are stored in the printer buffer 407, such data are transferred to the parallel/serial conversion circuit 404. Then, the image signal is transferred for every bit from the parallel/serial conversion circuit 404 to the record unit 105 through a serial interface, and thus the record unit 105 starts recording (FIG. 5).

In this case, since the image signals are stored in the image buffer 211 of the image process unit 102 in a unit of a line, it becomes easy to store the image signals in the working buffer 406 of the image memory 104 in a unit of a line, and also it becomes easy to perform the longitudinal/lateral converting on the image signals in the longitudinal/lateral conversion circuit 403.

Figure 6:
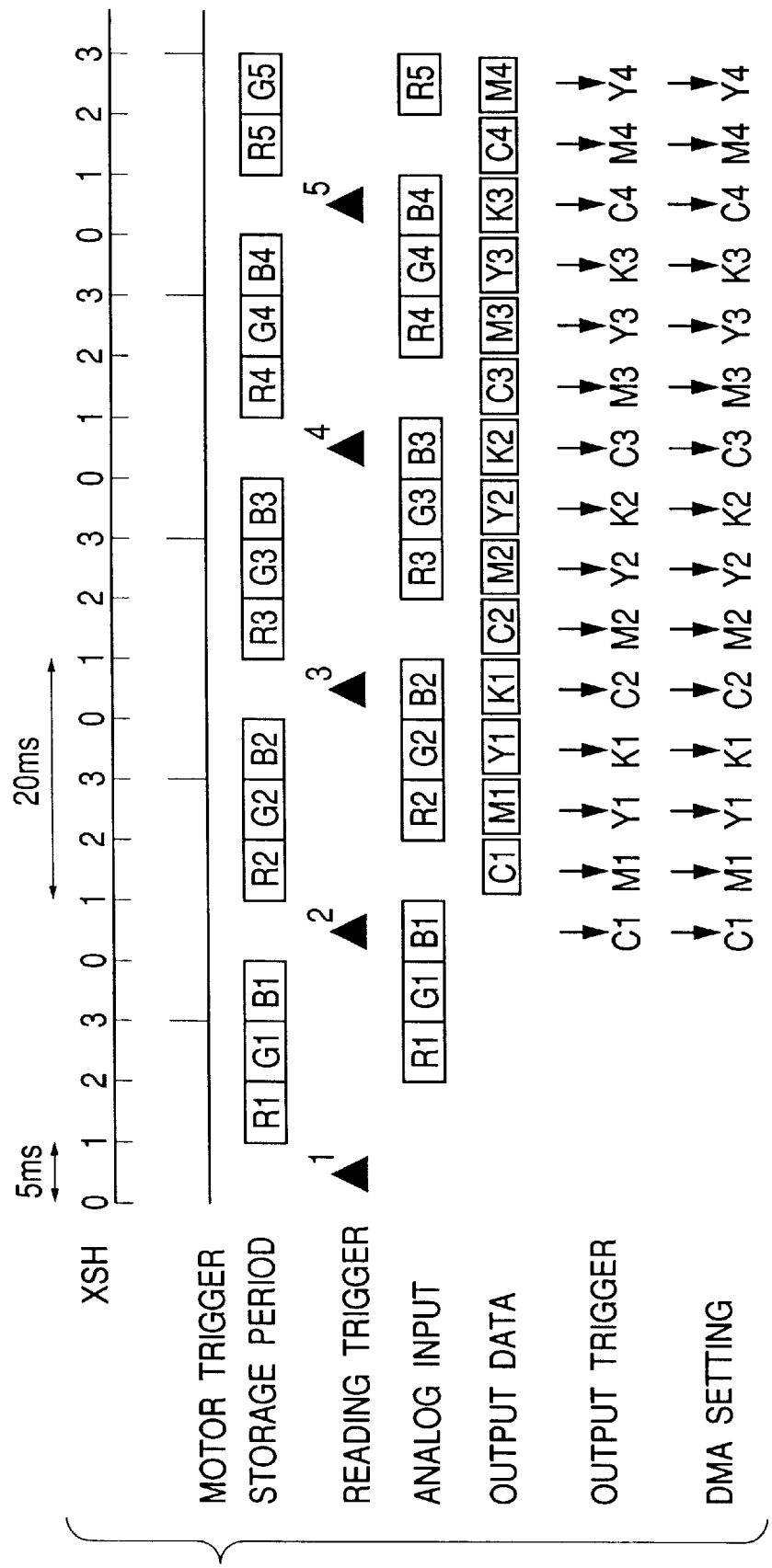
FIG. 6 is a timing chart of the present invention.

(FIG. 6: Explanation of Timing Chart)

On the basis of the above-described structure, details of the timing chart will be explained hereinafter with reference to FIG. 6. Reference symbol XSH denotes the clock which is outputted from the system gate array 103 every 5 ms and is in synchronism with the reading operation. All the triggers are based on the clock XSH. When the clock XSH is outputted, all the triggers are outputted from the main control unit 106 in an interrupting process using this clock XSH as the input.

Initially, a clock XSH(0) is outputted. Then, in the interrupting process of the reading, the reading trigger is outputted from the main control unit 106 to the image process unit 102. On the following lines, if there is a free or vacant area in the working buffer 406 of the image memory 104, the reading trigger is similarly outputted in synchronism with the clock XSH(0).

The reason why the reading trigger is outputted in synchronism with the clock XSH(0) is to make a reservation to start the reading operation in synchronism with a next clock XSH(1). When the reading trigger is outputted, the reader unit 101 turns on the light source R in synchronism with the next clock XSH(1) to start accumulating of the R signal. On the subsequent lines, the reading trigger is outputted in synchronism with the clock XSH(0), and the reading operation starts in synchronism with the clock XSH(1).

In synchronism with a clock XSH(0) subsequently outputted, the accumulated data of the R1 signal are inputted to the image process unit 102, the light source switching instruction is outputted from the image process unit 102 to the reader unit 101, the light source R is switched to the light source G in the reader unit 101, and the light source G is turned on to similarly accumulate the G1 signal as in the case of R1 signal. On the subsequent lines, in the reader unit 101, the light source R is similarly turned on in synchronism with the clock XSH(1) to accumulate the R signal, the R signal is inputted to the image process unit 102 in synchronism with the clock XSH(2), and the G signal is accumulated in the reader unit 101.

When a next clock XSH(3) is outputted, the G1 signal is similarly inputted to the image process unit 102 as in the case of the R1 signal, and the light source B is similarly turned on by the reader unit 101 to accumulate the B1 signal as in the case of the G1 signal. On the subsequent lines, the G signal is similarly inputted to the image process unit 102 in synchronism with the clock XSH(3), and the B signal is accumulated in the reader unit 101.

On the other hand, in synchronism with this clock XSH (3), the motor trigger is outputted from the main control unit 106 to the reader unit 101 through the system gate array 103. The motor trigger is used to drive a motor for feeding the original by one line to read the next line. If the motor trigger is outputted at this timing, the original is fed just between the clocks XSH(0) and XSH(1). Namely, the original is fed while the reader unit 101 does not actually perform the reading operation. Therefore, the accumulating of the R, G and B signals are performed at the same position in the sub-scan direction, whereby color misregistration or aberration can be prevented.

Further, on the subsequent lines, the paper-feeding motor trigger for reading the next line is similarly outputted in synchronism with the clock XSH(3). A clock XSH(4) is subsequently outputted. However, since the process for one line can terminate in 20 ms, one period is set as 20 ms. In this condition, a counter (not shown) in the main control unit 106 is reset, the clock XSH(4) is recognized as the clock XSH(0), and the reading trigger is again outputted to read the next line. Further, the B1 signal is similarly inputted in synchronism with the clock XSH(0) in the image process unit 102 as in the case of the G1 signal. On the subsequent lines, the B signal is similarly inputted to the image process unit 102 in synchronism with the clock XSH(0).

Since the C, M, Y and K signals are produced from the R, G and B signals for a period beginning from this clock XSH(0) to the next clock XSH(L) (i.e., 5 ms), preparation is made such that these signals can be transferred in synchronism with the next clock XSH(1) from the image buffer 209 of the image process unit 102 to the working buffer 406 of the image memory 104 through the system gate array 103. Thus, initially, in order to transfer the C1 signal in synchronism with the clock XSH(1) to the working buffer 406, the output trigger is outputted in synchronism with the clock XSH(0) from the main control unit 101 to the system gate array 103 to output the signal from the image buffer 211 to the serial/parallel conversion circuit 402, and the DMA setting is outputted in synchronism with the clock XSH(0) from the main control unit 101 to the DMA control unit 405 to perform the DMA transferring from the serial/parallel conversion circuit 402 to the working buffer 406.

If there is a free or vacant area in the working buffer 406, the line area to which the storing is performed is reserved in the working buffer 406 by such output trigger. If there is a free or vacant area in the working buffer 406 and the output trigger and the DMA setting have been outputted for the C1 signal in synchronism with the clock XSH(0), the transferring of the C1 signal to the working buffer 406 starts in synchronism with the next clock XSH(1). The one-line data transferring of each color component from the image buffer 211 to the working buffer 406 sufficiently terminates until the next clock XSH is outputted, i.e., within 5 ms. Therefore, when this clock XSH(1) is outputted, the output trigger and the DMA setting are similarly outputted for the M1 signal as in the case of the C1 signal, to reserve the transferring of the M1 signal.

Subsequently, in a similar manner, the output trigger and the DMA setting are outputted for the Y1 signal in synchronism with the clock XSH(2) to reserve the transferring of the Y1 signal, and then the output trigger and the DMA setting are outputted for the K1 signal in synchronism with the clock XSH(3) to reserve the transferring of the K1 signal. By such reserving, the M1, Y1 and K1 signals are transferred to the working buffer 406 in synchronism with the clocks XSH(2), XSH(3) and XSH(0), respectively.

As described above, the operation from the transferring of the initial reading trigger on one line to the transferring of all the C, M, Y and K signals to the working buffer 406 is completed in 45 ms. Similarly, on the subsequent lines, the output trigger and the DMA setting are outputted for the C signal and the K signal is transferred to the working buffer 409 in synchronism with the clock XSH(0), the output trigger and the DMA setting are outputted for the M signal and the C signal is transferred to the working buffer 409 in synchronism with the clock XSH(1), the output trigger and the DMA setting are outputted for the Y signal and the M signal is transferred to the working buffer 409 in synchronism with the clock XSH(2), and the output trigger and the DMA setting are outputted for the K signal and the C signal is transferred to the working buffer 409 in synchronism with the clock XSH(3).

As explained above, since the time necessary for transferring all the one-line C, M, Y and K signals is 20 ms which is the same as the time from the starting of reading on one line to the starting of reading on next line, the entire image transferring can be smoothly performed. Further, since the interrupting process such as the outputting of reading trigger, the outputting of original-feeding motor trigger, the outputting of C, M, Y and K signal output triggers, the outputting of C, M, Y and K signal DMA transfer setting and the like are all performed in synchronism with the clock XSH, software controlling can be relatively easily performed.

In the above-described embodiment, the analog output data from the reader unit 101 is used as the input data to the image process unit 102. However, the multivalue digital image data which has already been quantized (i.e., A/D converted), e.g., the digital data outputted from the modem 107 (FIG. 1) or the like, may be used as such input data.

As explained above, according to the image processing apparatus of the present invention, after the image data inputted in unit of pixel are sequentially converted by the first buffer into the image data managed in a unit of a line, the longitudinal/lateral converting can be effectively performed by the another buffer, whereby the easy writing and reading controlling can be performed.

Further, the input image data can be image-processed at high speed. Furthermore, such image-processed image data can be smoothly transferred to the another system at an independent timing. Furthermore, in case of transferring the image data to the another system, such data transferring can be performed in a form suitable for the image process by the another system.

The present invention can be variously modified within the spirit and scope of the appended claims.

What is claimed is:

1. An image processing apparatus which inputs image data in a unit of a line for each color component and outputs in a serial recording method using recording heads aligned in parallel in a sub-scanning direction comprising:

first write means for serially inputting each of plural kinds of color component data for each pixel, and writing each color component data into a first line buffer for each line;

second write means for reading in a unit of a line each color component data written in the first line buffer, and writing each color component data corresponding to the plural lines into a second line buffer having a storage capacity which is larger than that of the first line buffer;

conversion means for performing longitudinal-to-lateral converting by using each color component data corresponding to the plural lines written in the second line buffer; and output means for serially outputting a visible image representing each color component data corresponding to the plural lines converted by said conversion means.

2. An apparatus according to claim 1, wherein said first write means operates in response to a first sync signal, and said second write means and said conversion means operate in response to a second sync signal.

3. An apparatus according to claim 2, further comprising image process means for performing an image process on each of the plural kinds of color component data in response to the first sync signal, and outputting processed data to said first write means.

4. An apparatus according to claim 1, further comprising image process means for performing an image process on each of the plural kinds of color component data and outputting processed data to said first write means.

5. An apparatus according to claim 1, further comprising image read means for reading an image on each line and outputting each of the plural kinds of color component data on each pixel.

6. An apparatus according to claim 5, wherein said image read means generates and outputs the plural kinds of color component data by using R, G and B component data obtained by reading R, G and B components on each line.

7. An apparatus according to claim 6, wherein a time for reading by said image read means the R, G and B components allocated to each line is equal to a time for reading the plural kinds of color component data corresponding to each line from the first line buffer.

8. An apparatus according to claim 1, wherein the first line buffer has the storage capacity corresponding to at least two line on each color component.

9. An apparatus according to claim 1, wherein the second line buffer has the storage capacity corresponding to at least eight lines on each color component.

10. An apparatus according to claim 1, wherein the outputting of the visible image is performed on the plural lines.

11. An image processing method of an image forming apparatus which inputs image data in a unit of a line for each color component and outputs in a serial recording method using recording heads aligned in parallel in a sub-scanning direction comprising:

a first write step of serially inputting each of plural kinds of color component data for each pixel, and writing each color component data for each line into a first line buffer;

a second write step of reading in a unit of a line each color component data written in the first line buffer, and writing each color component data corresponding to the plural lines into a second line buffer having a capacity which is larger than that of the first line buffer;

a conversion step of performing longitudinal-to-lateral converting by using each color component data corresponding to the plural lines written in the second line buffer; and an output step of serially outputting a visible image representing each color component data corresponding to the plural lines converted in said conversion step.

12. An image processing apparatus which inputs image data in a unit of a line for each color component and outputs the image data to a recording unit of a serial recording method using recording heads aligned on parallel in a sub-scanning direction comprising:

an image process unit for performing an image process on color component data of plural colors serially inputted by predetermined input means, in response to a first sync signal;

first write means for writing image data subjected to the image process by said image process unit, into a first line buffer in response to the first sync signal;

second write means for writing the image data stored in the first line buffer, into a second line buffer operating in response to a second sync signal; and output means for serially outputting the image data stored in the second line buffer.

13. An apparatus according to claim 12, wherein said predetermined input means comprises a sensor array arranged one-dimensionally and light source means of the plural colors, and said predetermined input means converts reflection light obtained by illuminating an original with light into an electrical signal, reads color information on the original by time-divisionally switching the turned-on light source means, and outputs the color component data of the plural colors.

14. An apparatus according to claim 12, wherein said image process unit performs the image process on each of the color component data of the plural colors, in unit of line.

15. An apparatus according to claim 12, wherein said predetermined input means generates the color component data of the plural colors by reading an original, and a time necessary for reading the original of one line does not exceed a time necessary for transferring the plural kinds of color component data corresponding to one line from the first line buffer to the second line buffer.

16. An apparatus according to claim 12, further comprising visible image formation means for forming a visible image by using the image data stored in the second line buffer.

17. An apparatus according to claim 16, wherein said visible image formation means forms the visible image in unit of plural lines.

18. An apparatus according to claim 12, wherein the first line buffer can store each of the color component data of the plural colors corresponding to at least two lines.

19. An apparatus according to claim 12, wherein the second line buffer can store each of the color component data of the plural colors corresponding to at least eight lines.

20. An apparatus according to claim 12, wherein the second line buffer is a line buffer which temporarily stores the data to be sent to longitudinal-to-lateral conversion means for performing longitudinal-to-lateral converting.

21. An apparatus according to claim 12, wherein speed for writing the image data subjected to the image process by said image process unit into the first line buffer is faster than speed for reading the image data when the image data stored in the first line buffer is written into the second line buffer.

22. An apparatus according to claim 12, further comprising generation means for generating a third sync signal, and wherein said image process unit inputs the color component data of the plural colors in synchronism with the third sync signal, and outputs the image data subjected to the image process in synchronism with the third sync signal.

23. An image processing method to be executed in an image processing apparatus which inputs image data in a unit of a line for each color component and outputs the image data to a recording unit of a serial recording method using recording heads aligned in parallel in a sub-scanning direction and which has an image processing unit for performing responsive to a first sync signal an image process on color component data of plural colors serially inputted by a predetermined input means, said method comprising:

a first write step of writing image data subjected to the image process by the image process unit, into a first line buffer in response to the first sync signal;

a second write step of writing the image data stored in the first line buffer, into a second line buffer operating in response to a second sync signal; and an output step of serially outputting the image data stored in the second line buffer.

* * * * *

UNITED STATES PATENT AND TRADEMARK OFFICE
CERTIFICATE OF CORRECTION

PATENT NO.   : 6,307,651 B1
DATED        : October 23, 2001
INVENTOR(S)  : Atsushi Ohtani et al.

It is certified that error appears in the above-identified patent and that said Letters Patent is hereby corrected as shown below:

Column 2,
Line 56, "An another" should read -- Another --; and
Line 60, "another" should be deleted.

Column 4,
Line 34, "Converting" should read -- converting --.

Column 5,
Line 11, "invertion in" should read -- invention. In --.

Column 6,
Line 26, "- and" should read -- M- and --; and
Line 28, "- and" should read -- M- and --.

Column 8,
Line 47, "terminate" should read -- terminates --; and
Line 66, "operation." should read -- operations. --.

Column 9,
Line 50, "designate" should read -- designates --; and
Line 53, "unit" should read -- units --.

Column 11,
Line 16, "XSHCL)" should read -- XSH(1) --.

UNITED STATES PATENT AND TRADEMARK OFFICE
CERTIFICATE OF CORRECTION

PATENT NO. : 6,307,651 B1
DATED : October 23, 2001
INVENTOR(S) : Atsushi Ohtani et al.

It is certified that error appears in the above-identified patent and that said Letters Patent is hereby corrected as shown below:

Column 13,
Line 11, "line" should read -- lines --; and
Line 42, "on" should read -- in --.

Signed and Sealed this

Sixteenth Day of July, 2002

Attest:

Attesting Officer

JAMES E. ROGAN
Director of the United States Patent and Trademark Office